(12) United States Patent
Reasoner

(10) Patent No.: US 7,927,036 B2
(45) Date of Patent: Apr. 19, 2011

(54) QUICK CONNECT WITH MALE AND FEMALE TERMINALS

(76) Inventor: Michael V. Reasoner, Davison, MI (US)

( * ) Notice: Subject to any disclaimer, the term of this patent is extended or adjusted under 35 U.S.C. 154(b) by 180 days.

(21) Appl. No.: 12/436,861

(22) Filed: May 7, 2009

(65) Prior Publication Data

US 2009/0285625 A1 Nov. 19, 2009

Related U.S. Application Data

(60) Provisional application No. 61/053,931, filed on May 16, 2008.

(51) Int. Cl.
*F16B 7/00* (2006.01)
(52) U.S. Cl. ........... 403/341; 403/90; 403/302; 403/316
(58) Field of Classification Search .................... 403/90, 403/144, 146, 302, 313, 316, 325, 327, 329, 403/341
See application file for complete search history.

(56) References Cited

U.S. PATENT DOCUMENTS

| | | | | |
|---|---|---|---|---|
| 1,856,917 A | * | 5/1932 | Jordan et al. | 403/341 |
| 2,448,817 A | * | 9/1948 | McArthur | 403/321 |
| 2,859,060 A | * | 11/1958 | Davies et al. | 403/122 |
| 3,413,692 A | * | 12/1968 | Pressley | 24/602 |
| 3,918,679 A | | 11/1975 | Silvana | |
| 4,501,404 A | * | 2/1985 | Nelson | 248/503.1 |
| 4,595,310 A | | 6/1986 | Ausprung | |
| 4,614,457 A | | 9/1986 | Sammon | |
| 4,733,625 A | * | 3/1988 | Allen | 403/289 |
| 5,035,528 A | * | 7/1991 | Thau | 403/290 |
| 5,255,714 A | | 10/1993 | Mullins | |
| 5,372,446 A | | 12/1994 | Chamberlin | |
| 5,746,548 A | * | 5/1998 | Crandall | 403/316 |
| 5,833,383 A | | 11/1998 | Bauman | |
| 6,003,414 A | | 12/1999 | Hsieh | |
| 6,206,604 B1 | | 3/2001 | Dembowsky et al. | |
| 6,802,275 B2 | * | 10/2004 | Schmidt | 114/361 |
| 7,124,864 B2 | | 10/2006 | Jones et al. | |
| 7,384,209 B2 | | 6/2008 | Muders et al. | |
| 7,637,686 B2 | * | 12/2009 | Wood et al. | 403/302 |
| 2007/0257485 A1 | | 11/2007 | Arosio | |

* cited by examiner

*Primary Examiner* — Joshua T Kennedy
(74) *Attorney, Agent, or Firm* — Gifford, Krass, Sprinkle, Anderson & Citkowski, P.C.

(57) ABSTRACT

A quick connect assembly having a female terminal exhibiting an interior passage communicating with a connecting end. The passage is defined by inwardly facing surfaces associated with a plurality of linearly extending and peripherally arrayed beams, the passage exhibiting an enlarged profile an inwardly recessed distance from the connecting end. A male terminal includes a projecting portion generally matching the enlarged profile. The male terminal is inserted into the female terminal, causing the beams to outwardly deflect, following which the beams inwardly retract concurrent with the projecting portion seating within the inner profile. A linearly displaceable and sleeve shaped covering cap is spring supported upon the male terminal and displaceable between a first anti-biased position permitting outward deflection of the beams and a second biased position seating over projecting ends of the beams to prevent inadvertent disengagement of the terminals.

10 Claims, 3 Drawing Sheets

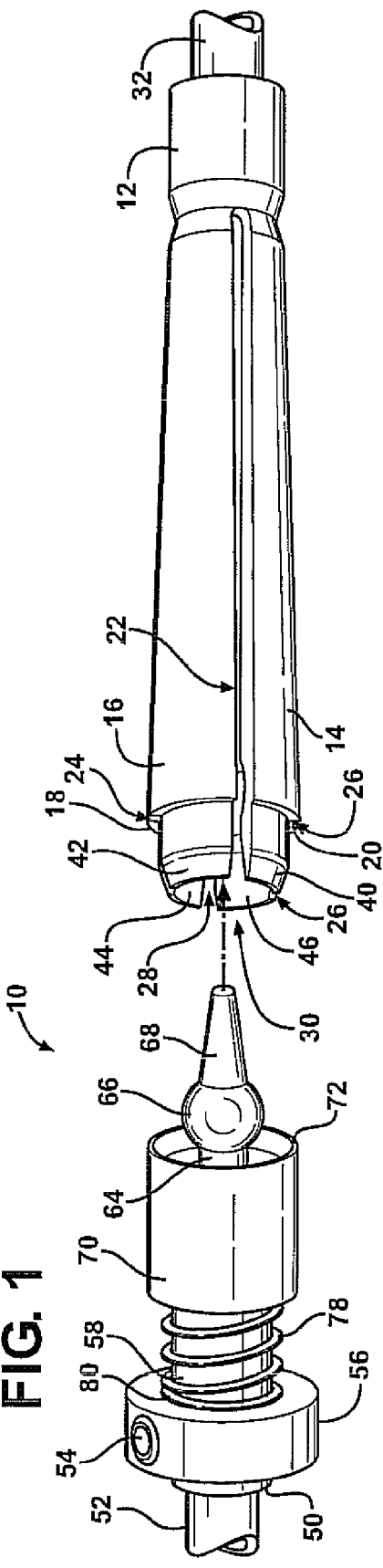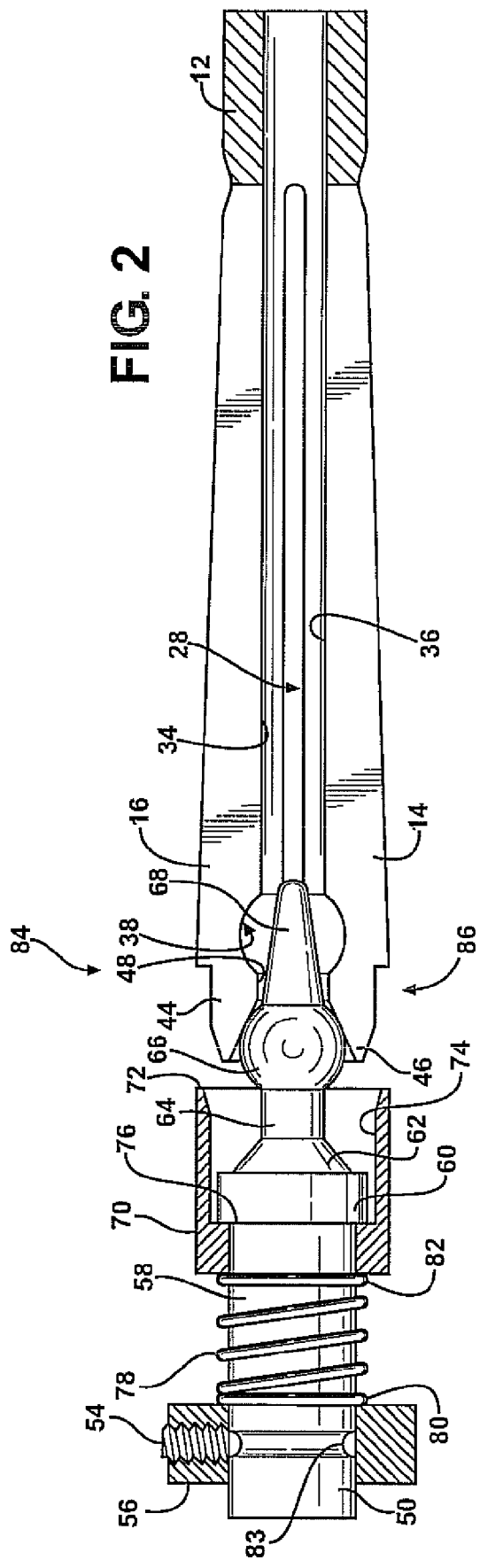

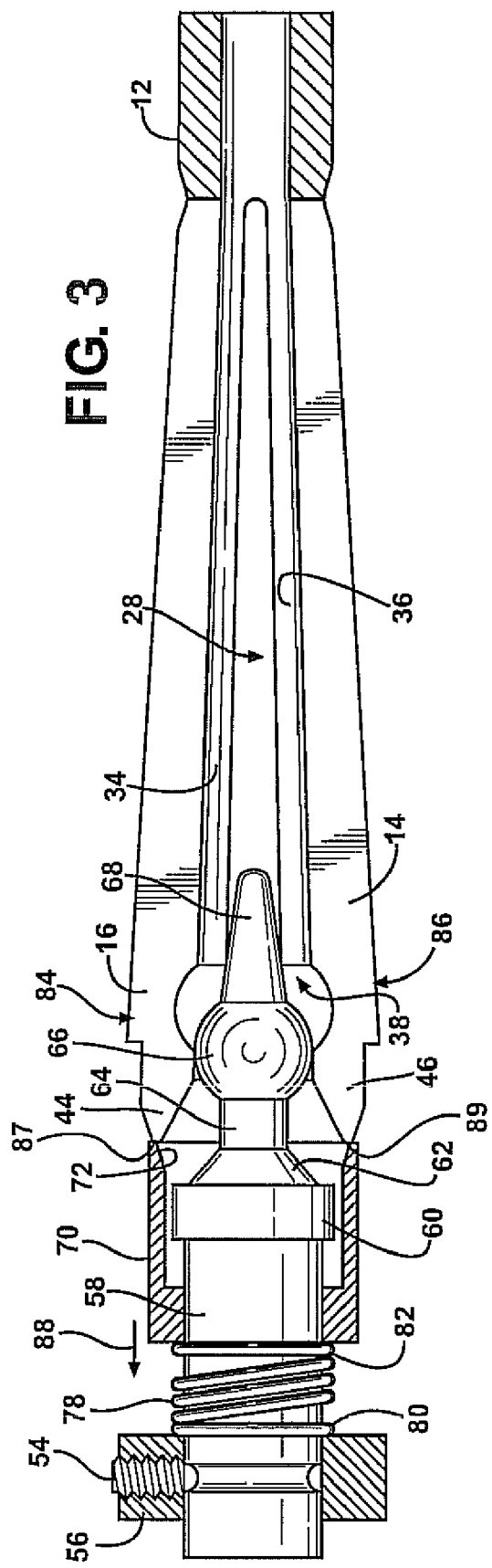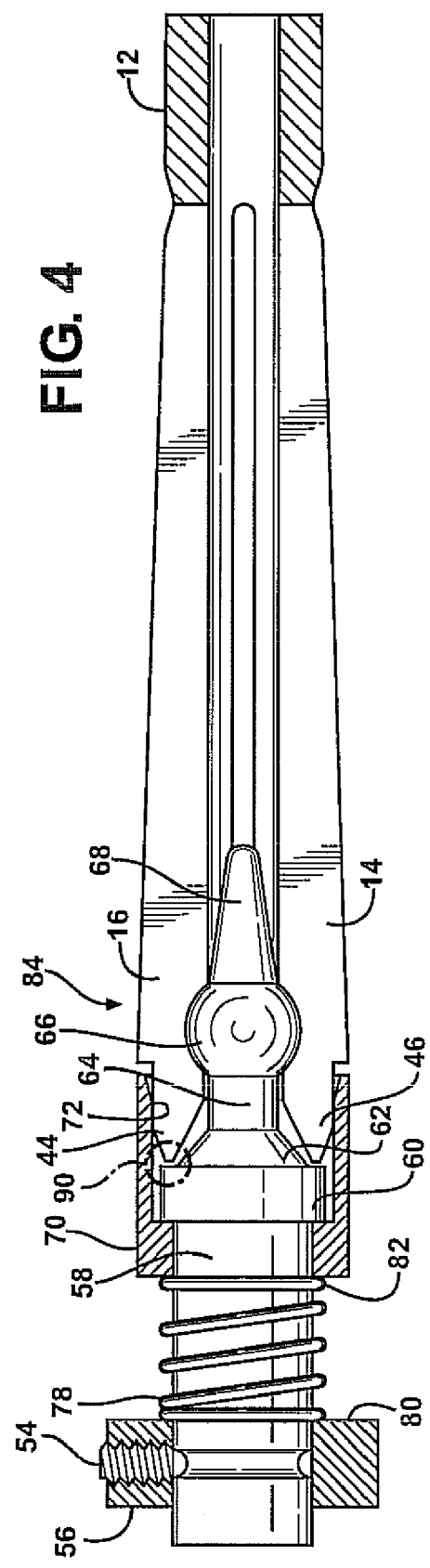

QUICK CONNECT WITH MALE AND FEMALE TERMINALS

CROSS-REFERENCE TO RELATED APPLICATIONS

The present application claims the priority of U.S. Provisional Patent Application Ser. No. 61/053,931 filed May 16, 2008.

FIELD OF THE INVENTION

The present invention discloses a quick connect assembly which functions without the requirement for clips and fasteners for retaining together first male and second female connector portions. Specific applications and features include such as rotate-ability, auto-locking serviceability, as well as tension and compression load bearing connection of any type including cable wire connections and the like, this optionally providing electrical connectivity/conductivity and in addition to mechanical applications which do not require electrical connection between the male and female terminals.

BACKGROUND OF THE INVENTION

Quick connect couplings are well known in the art, such as include first and second engageable members (these also including such as other known male and female or ball and socket members). These quick connect assemblies function to quickly and efficiently engage together the members and their associated structures, such further typically including male and female extending cables, electrical wires or the like.

A known problem associated with such quick connectors is the requirement for utilizing additional clips or fasteners for retaining together the male/female portions, this adding to both the cost and complexity of the connector assembly. Examples of known quick release assemblies include such as the quick-release socket adapter set forth in Hsieh, U.S. Pat. No. 6,003,414, the ball-and-socket joint connection of Muders, U.S. Pat. No. 7,384,209 and the plug-in coupling of Dembowsky, U.S. Pat. No. 6,206,604.

SUMMARY OF THE INVENTION

The present invention teaches an improved quick connect assembly which does not require the provision of additional clips or fasteners for holding together male and female terminals. The female terminal exhibits a generally elongated and three dimensional configuration established by a plurality of linearly extending and peripherally arrayed beams. The beams are spring loaded, such as by the provision of spacing slots or recesses designed into the female terminal and extending from an open end along linear edge boundaries defined between selected beams.

The beams each include an inwardly facing surface collectively defining an interior passage communicating with the open connecting end. The passage exhibits an enlarged profile, such as a recess defined spherical shape, a selected inwardly recessed distance from the connecting end.

A male terminal includes a projecting portion, this including a generally spherical shape generally matching the enlarged spherical shape profile in the female terminal. The projecting portion of the male terminal is inserted through the open end of the female terminal, causing the beams to initially and outwardly deflect, following which the beams inwardly retract concurrent with the spherical projecting portion seating within the mating spherical inner profile.

A linearly displaceable and sleeve shaped covering cap is supported upon the male terminal in a biasing direction towards the spherical shaped projecting portion. The covering cap is displaces in a first anti-biasing direction (such as toward an end of the male terminal opposite the spherical shaped projection), his providing clearance for the outward deflecting motion of the beams. Upon seating of the male projection into the female recessed profile and concurrent retraction of the spring loaded beams, the cap is released and its bias force displaces an open ended and annular shaped wall of the cap into a seating position over the projecting ends of the beams, thereby preventing inadvertent disengagement of the terminals under tension, compression or bending leads. Final seating position provides a zero free play joint.

The male terminal may also include a tapered nose extending from the spherical (or other 3D shaped) projecting portion, this guiding insertion of the male terminal into the female terminal end. The spring biased beams of the female terminal further each include an integrally formed finger associated with the female inserting end recess.

The spherical enlarged shape is spaced a specified distance from a main body portion of the male terminal by a narrow diameter neck portion, the dimensions of which permit the tapered nose and spherical shape to be linearly and resistively engaged against the end defined fingers. An annular undercut portion is defined at a linear location associated with the male terminal main body and seating therein a first annular winding end associated with an assembleable coil spring. The spring so mounted biases and linearly displaces the cover cap in a lineal direction so that its open ended and inner facing annular seating surface coaxially overlays the end fingers associated with the deflectable beams, thus maintaining the seating engagement of the male enlarged shape within the female inner profile.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a perspective illustration of the quick connect assembly according to one embodiment of the present invention;

FIG. 2 is a linear cutaway view of an initial contact condition of the quick connect assembly and illustrating the spherical shaped projection and tapered nose of the male terminal in position relative the encircling integral fingers of the female terminal contact beams;

FIG. 3 is a succeeding and intermediate engaging illustration of the assembly shown in FIG. 2, and by which female terminal beams are caused to be outwardly deflected in response to linear insertion of the male spherical portion and concurrent with the covering cap being displaced in a first anti-bias and clearance permitting direction relative to the outwardly deflecting beams;

FIG. 4 is a further succeeding illustration in which the terminal beams retract concurrent with the spherical shaped recess seating within the mating spherical inner profile of the female terminal, the cover cap being released to displace over the ends of the spring beams, thereby retaining the male terminal in contact with the female terminal positioned.

DETAILED DESCRIPTION OF THE PREFERRED EMBODIMENTS

Figure 5:
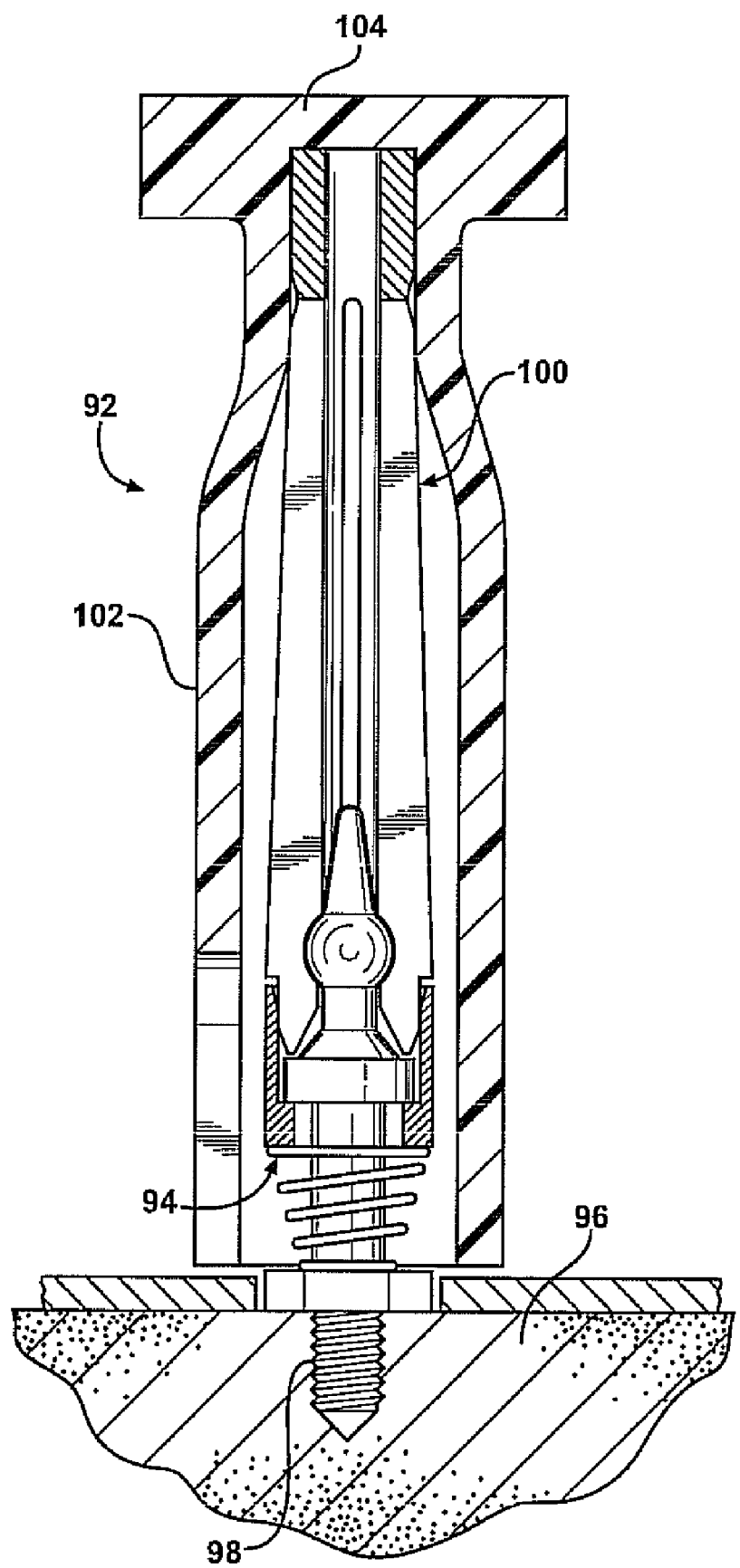
FIG. 5 is a cutaway illustration of a quick connect assembly according to a farther preferred embodiment and such as which associated within a storm shutter application in which a male terminal is anchored to a window or doorway opening, a female terminal being secured to an engaging location of a storm curtain or door.

Referring now to each of FIGS. 1-4, an improved quick connect assembly is generally shown at 10 according to a first preferred embodiment. As previously described, the present invention provides a more efficient quick connect assembly with male and female connecting portions and which does not require the provision of additional clips or fasteners.

The connector assembly illustrates a female terminal which possesses a generally elongated body including a generally annular shaped end, see at 12, and from which extend a plurality of linear extending and spring biasing beams 14, 16, 18 and 20. The beams 14-20 collectively exhibit a generally elongated and three dimensional configuration.

The beams are constructed so that opposing and linear extending edges of each beam are spaced apart to render the beams deflectable and spring loaded. This is illustrated by the beams being spaced in a circumferential fashion, thereby establishing a like plurality of elongate and linear extending spacing slots or recesses (see as best shown at 22, 24, 26 and 28 in FIG. 1) these being designed into the female terminal and extending from an open inserting end 30 along the linear edge boundaries defined between selected beams and until terminating at the closed and generally annular shaped end 12.

The annular shaped end 12 of the female terminal can secure an extending end (at 32) of such as a mechanical cable or, in an alternate application, an electrical wire. In the latter application, the female terminal, in addition to the male terminal to be subsequently described, may be constructed of a steel or other metallic composition so as to provide the necessary degree of electrical conductivity. The female terminal and associated beams can alternatively be constructed of any plastics or other desired material.

In a first application, it is desired to utilize a steel or like composite material exhibiting the desired properties of spring resistance and durability and further for the purpose of establishing conductivity between the male and female connector portions in instance of electrical applications. In further applications, it is also understood that modern composite plastics can likewise exhibit the necessary strength, resilience and anti-creep/anti-deformation properties which make it a suitable candidate for substituting for metal in other and additional applications. Also, and while four spaced and linear extending beams are illustrated, it is further understood that any plurality of beams, including two, three, five or other number can be provided.

The beams each further exhibit an inner facing surface, see at shown at 34 and 36 in the cutaway of FIG. 2 and which reference to selected beams 18 and 20. The opposing and linearly extending inner surfaces of the beams collectively defining an interior passage communicating the open inserting and connecting end 30 with an enlarged inner profile, such as further shown as a recess defined spherical shape 38 which is a selected inwardly recessed distance from the connecting or engaging end 30. The inner surfaces provide thickness for the beams necessary for strength under tension and compression leads as well as deflection.

The beams each further include end extending and angled/tapered engaging fingers, see as shown at 40, 42, 44 and 46 for each of beams 14, 16, 18 and 20. The fingers 40-46 are separated from the inner three dimensional spherical profile 38 by a (typically planar) transition region 48, see further FIG. 2.

A male terminal includes a body exhibiting a first end 50, such as which secures an end 52 of a second cable or wire which can be held in place by a set screw 54 projecting laterally from a fixed supporting end collar 56 or mechanical crimping of said male terminal. A stem 58 extends from the end collar 56 and, as best shown in the cutaway view of FIG. 2, terminates in an enlarged diameter end stop 60.

A further projecting portion is shown and includes a transition portion 62 extending from a forward surface of the end stop 60. The transition portion 62 is succeeded by a constant diameter neck portion 64 of given dimension, this communicating with a spherical shaped portion 66. Extending from a forward end of the spherical shaped portion is a forward extending and tapered nose 68.

A linearly displaceable and sleeve shaped covering cap 70 is shown in perspective in FIG. 1, as well as in cutaway in each of succeeding views FIGS. 2-4. The cap 70 includes a generally annular shape with an open interior accessible from a forward end tapered end, at 72, this revealing an inwardly facing and supporting annular surface 74.

The cap 70 is displaceably supported upon the stem 58 of the male terminal and so that a radially inwardly projecting base surface, see at 76 in FIG. 2, responds to a normal biasing force in order to abut the fixed end stop 60 associated with the male terminal stem 58, thereby biasing the covering cap 70 in a direction towards the spherical shaped projecting portion 66.

A coil spring 78 is further provided in wound fashion around the stem 58 and includes a first end 80, see FIG. 2, biasing against an opposing surface of the fixed supporting end collar 56. Also, the collar 56 can be removed to provide access to an annular recessed or protruding groove 83. A second end 82 of the spring, again FIG. 2, biasingly displaces against an external base surface of the cap 70. In this fashion, the covering cap 70 can be made to displace in a first anti-biasing direction (such as toward the end defined collar 56 of the male terminal opposite the spherical shaped projection 66), this providing clearance for the subsequent outward deflecting motion of the female terminal and passageway defining beams 14, 16, 18 and 20. It is also understood and envisioned that different types of biasing and influencing structure, apart from a coil spring as shown, can also be utilized and which asserts the requisite retaining forces on the covering cap 70.

As shown in FIG. 2, a linear cutaway view of an initial contact condition of the quick connect assembly illustrates the spherical shaped projection 66 of the male terminal, these arranged in position relative the extending and angled/tapered engaging fingers, see again as shown at 40, 42, 44 and 46 for each of beams 14, 16, 18 and 20, and with the tapered nose 68 projecting in an initially inserting and pre-engaging position relative to the interiorly defined passageway and the located internal enlarged spherical profile 38. The tapered nose 68 operates to provide guiding insertion of the male terminal, and in particular the spherical shaped portion 66, into the open facing female terminal end, again at 30 in FIG. 1.

Referring further to FIG. 3, a succeeding and intermediate engaging illustration is shown of the assembly shown in FIG. 2, and by which female terminal beams 14-20 are caused to be outwardly deflected (see as reflected by directional arrows 84 and 86). Outer deflection of the beams is in response to linear insertion of the male spherical portion 66 and concurrent with the covering cap 70 being displaced by abutting a flat end surface of the cover at 87 with a corresponding flat end surface of the female side at 89 in order to create an overlap in a first anti-bias and clearance permitting direction (see further arrow 88) relative to the outwardly deflecting beams. The overlap is further shown in FIG. 3 created between the opposing surfaces 87 and 89 to facilitate rearward displacement at the covering cap 70.

As further referenced in FIG. 4, a farther succeeding illustration is shown and in which the terminal beams 14-20 retract, concurrent with the spherical shaped recess profile 38 seating around the inserted and projecting spherical projection 66. At this point, the cover cap 70 is released such that the spring biasing forces cause it to displace in its normal biasing direction and so that its inwardly facing annular wall seats over the projecting ends angled/tapered engaging fingers, see as shown at 40, 42, 44 and 46 for each of beams 14, 16, 18 and 20. At this point, the male terminal is retained in contact with the female terminal in a fashion which prevents inadvertent disengagement of the terminals under tension, compression and other bending loads. Final seating position provides a zero free play joint.

As further illustrated in FIG. 4, a predetermined spacing or gap is designed into the terminal assembly (such as by designing the correct dimensions into the transition portion 62 and neck portion 64 of the male terminal). This is in particular shown at 90 established between the tapered edge of each beam extending finger (e.g. at 44 for beam 16) relative to an opposing surface of the enlarged diameter end stop 60 of the male terminal.

The provision of a desired gap (or dimensional tolerancing) is desired to ensure that proper and complete seating is established between the spherical shaped projection 66 of the male terminal and the encircling and mating enlarged profile 38 collectively defined by the four spaced apart and spring bias compressible female terminal beams 14-20. As further shown in FIG. 4, the dimensioning of the forward tapered and terminating nose 68 is such that it does not interfere with the surrounding surfaces of the female terminal passageway upon seating engagement between the male and female terminal portions.

Otherwise, and upon engagement in the seating and locking position of FIG. 4, the male and female terminals are permitted freedom of rotation thus removing any range of torsional loading. It is further envisioned and understood that varying the configuration of the mating male projecting portion 66 and female interior profile 38 can be undertaken in order to modify the performance characteristics of the assembly, such as to selectively avoid rotation between the terminal components and/or to vary structural retention properties in combination with the retaining bias exerted by the over seating and biased cover cap 70.

Referring now to FIG. 5, a cutaway illustration is generally shown at 92 of a quick connect assembly according to a further preferred embodiment, and such as which associated with a storm shutter application in which a modified male terminal, generally shown at 94, is anchored to a surface defined material 96 which defines in part a window or doorway opening. The male terminal 94 is configured substantially identically to that disclosed in the previous illustrated embodiment of FIGS. 1-4, except that it is disposed to project upwardly (or downwardly) from a surface associated with the material 96, this further enabled by an anchor or like fastener, shown at 98, which embeds within the concrete or other suitable material within which the opening is defined.

A female terminal, further generally shown at 100 is secured to an engaging location of such as a storm curtain or door (not shown). The reconfigured female terminal is further reflected by an outer casing portion 102 surrounding the female terminal and its deflectable beams and providing protection, as well as a projecting anchoring portion 104, such as to which a pivoting shutter curtain or the like can be pivotally secured or anchored. The purpose of FIG. 5 is to illustrate the range of potential applications of the quick connect assembly, and which is not limited to mechanical cables, electrical conduits or the like.

Having described my invention, other and additional preferred embodiments would be obvious to one of ordinary skill in the art to which the invention pertains, and without deviating from the scope of the appended claims:

I claim:

1. A quick connect assembly, comprising:
   a female terminal established by a plurality of linearly extending and peripherally arrayed beams, the beams each including an inwardly facing surface collectively defining an interior passage communicating with an open end, said passage exhibiting an enlarged profile an inwardly recessed distance from said end;
   a male terminal including a projecting portion generally matching in shape said enlarged profile, said projecting portion inserting through said end of the female terminal, causing said beams to outwardly deflect, following which said beams inwardly retract concurrent with said projecting portion seating within said profile; and
   a linearly displaceable and sleeve shaped covering cap supported upon a stem portion associated with said male terminal in a biasing direction towards the projecting portion such that, upon displacing said female terminal against said male terminal to cause outward deflection of said beams, said beams overlapping with and contacting said covering cap and causing said cap to retract in a first anti-biasing direction away from said projecting portion, subsequent inward retraction of said beams resulting from said projecting portion seating within said enlarged profile terminating said position over ends of said beams in order to prevent inadvertent disengagement of said terminals.

2. The assembly as described in claim 1, further comprising said linearly extending and peripherally arrayed beams being circumferentially spaced relative to one another so that linear extending slots are defined from said open end to a closed and generally annular shaped end.

3. The assembly as described in claim 2, said beams further comprising spring biasing portions terminating in integrally formed and tapered fingers associated with said open end and over which seats said biased and linearly displaceable cap.

4. The assembly as described in claim 2, further comprising a first cable securing to said generally annular shaped end of said female terminal, a second cable securing to an opposite extending end of said male terminal.

5. The assembly as described in claim 1, said projecting portion further comprising a substantially spherical shaped portion which seats within a mating and spherical shaped enlarged profile.

6. The assembly as described in claim 5, said male terminal further comprising a tapered nose extending from said projecting portion for guiding insertion of said male terminal into said female terminal.

7. The assembly as described in claim 6, said projecting portion being spaced a specified distance from an end stop of said male terminal by a narrow diameter neck portion.

8. The assembly as described in claim 1, further comprising a coil spring seated about a stem portion associated with said male terminal and biasing said displaceable cap in a direction toward said projecting portion.

9. The assembly as described in claim 1, further comprising said male terminal being anchored upon a surface of a material, said female terminal further comprising an outer casing portion defining a part of a curtain portion.

10. A quick connect assembly, comprising:
a female terminal having a plurality of linearly extending and peripherally arrayed beams collectively defining an interior passage communicating with an open end thereof, said interior passage having an enlarged interior profile;
a male terminal including a projecting portion matching in shape said enlarged interior profile, said projecting portion being inserted through said open end of the female terminal, causing said beams to outwardly deflect in an initial installation stage, following which said beams inwardly retract concurrent with said projecting portion seating within said enlarged interior profile; and
a linearly displaceable cap supported upon said male terminal and biased in a direction towards the projecting portion, said covering cap being displaced in a first direction away from said projecting portion upon being contacted by said outwardly deflecting beams in an overlap established condition during said initial installation of said female terminal against said male terminal concurrent with outward deflection of said beams, said resultant inward retraction of said beams concurrent with said projecting portion seating within said enlarged interior profile releases said cap to displace to a seating position over ends of said beams to prevent inadvertent disengagement of said terminals.

* * * * *